United States Patent [19]

Aufdermarsh et al.

[11] Patent Number: 4,600,651
[45] Date of Patent: Jul. 15, 1986

[54] FLUOROELASTOMER LAMINATES

[75] Inventors: Carl A. Aufdermarsh, Houston, Tex.; Robert J. Harder; Phillip P. Spiegelman, both of Wilmington, Del.

[73] Assignee: E. I. Du Pont de Nemours and Company, Wilmington, Del.

[21] Appl. No.: 637,781

[22] Filed: Aug. 6, 1984

[51] Int. Cl.[4] .................. B32B 25/20; B32B 27/06
[52] U.S. Cl. .................................... 428/422; 428/421; 428/448; 428/450; 428/451; 428/906; 428/463; 428/461; 428/36; 430/99; 215/DIG. 2
[58] Field of Search ............... 428/421, 451, 422, 450, 428/448, 906, 461, 463

[56] References Cited

U.S. PATENT DOCUMENTS

| | | | |
|---|---|---|---|
| T912,018 | 7/1973 | Maskornick | 156/333 |
| T934,010 | 5/1975 | Maskornick | 29/130 |
| 4,035,565 | 7/1977 | Apotheker et al. | 526/249 |
| 4,199,626 | 4/1980 | Stryjewski et al. | 427/444 |
| 4,214,060 | 7/1980 | Apotheker et al. | 525/387 |
| 4,375,505 | 3/1983 | Newkirk | 428/422 |
| 4,395,462 | 7/1983 | Polmanteer | 428/420 |
| 4,430,406 | 2/1984 | Newkirk | 430/99 |
| 4,434,355 | 2/1984 | Inagaki et al. | 219/216 |

*Primary Examiner*—P. C. Ives

[57] ABSTRACT

Laminates prepared by co-curing terpolymers of tetrafluoroethylene, perfluoromethyl perfluorovinylether, and a halogen-containing cure site monomer with a second peroxide-curable elastomer. The laminates can be bonded to a variety of substrates.

10 Claims, No Drawings

FLUOROELASTOMER LAMINATES

BACKGROUND OF THE INVENTION

Elastomeric and nonelastomeric polymers prepared from tetrafluoroethylene and perfluoroalkyl perfluorovinylether have been used in the past for products having good resistance to heat, solvents and/or corrosive chemicals. Frequently, termonomers are incorporated into the polymer to further improve the performance characteristics or provide cure sites. Despite the thermal and oxidative stability of these copolymers and other excellent characteristics, their applicability for some end uses has been limited by their relative inability to adhere to a variety of surfaces.

SUMMARY OF THE INVENTION

The present invention provides a laminate of copolymers of polytetrafluoroethylene and perfluoroalkyl perfluorovinylethers with a polymeric second layer, which second layer can be bonded to a variety of substrates.

Specifically, the instant invention provides a co-cured laminate prepared from (a) a first layer of peroxide curable elastomer composition of a terpolymer of tetrafluoroethylene, a perfluoroalkyl perfluorovinylether wherein the alkyl group contains 1 to 5 carbon atoms, and up to about 2 mole percent of units derived from an ethylenically unsaturated compound having a bromo- or iodo-substituent in an amount sufficient to provide at least about 0.1 mole percent bromine or iodine in the resulting terpolymer, and (b) a second layer of peroxide curable elastomer composition of a polymer selected from the group consisting of
  (1) copolymers prepared from monomers consisting essentially of tetrafluoroethylene, hexafluoropropylene, vinylidene fluoride and a bromo- or iodo cure site monomer;
  (2) silicone elastomers, and
  (3) copolymers of tetrafluoroethylene and propylene.

The instant invention further provides a structure comprising a substrate having bonded thereto a co-cured laminate as described above in which the second layer of the laminate is bonded to the substrate.

DETAILED DESCRIPTION OF THE INVENTION

The basic component of the present laminate is a terpolymer of tetrafluoroethylene, a perfluoroalkyl perfluorovinylether in which the alkyl group contains from 1 to 5 carbon atoms, and up to about two mole percent of units derived from an ethylenically unsaturated compound having a bromo- or iodo-substituent in an amount sufficient to provide at least about 0.1 mole percent bromine or iodine in the resulting terpolymer. These terpolymers can be prepared according to the general procedures of Apotheker et al., U.S. Pat. No. 4,035,565, hereby incorporated by reference. A wide variety of unsaturated compounds can be used for introducing the bromo- or iodo-substituents into the terpolymer. These include, for example, bromotrifluoroethylene, 4-bromo-3,3,4,4-tetrafluorobutene-1, iodotetrafluorobutene-1, and perfluorovinyl ethers bearing a bromo- or iodo-substituent. Such monomers are described in greater detail in copending patent applications of Uschold U.S. Ser. No. 353,816 filed Mar. 2, 1982, now U.S. Pat. No. 4,420,638, and Krespan, Ser. No. 472,101 filed Mar. 4, 1983, now U.S. Pat. No. 4,531,011, both of which are hereby incorporated by reference. 4-Iodo-3,3,4,4-tetrafluorobutene-1 (ITFB) has been found to be particularly useful in this invention, and is described in U.S. Pat. No. 3,016,407, also hereby incorporated by reference.

The resulting terpolymer containing the bromine or iodine substituents should contain at least 0.1 mole percent bromine or iodine. The purpose of the bromine or iodine is to permit peroxide curing of the resulting terpolymer. These curing characteristics are not realized with concentrations of the bromine or iodine at less than this level, and no significant improvement in curing characteristics is realized at concentrations of the bromine or iodine in the terpolymer greater than about 2 mole percent.

The polymers used in each layer of the present laminates are formed into a film according to usual techniques prior to curing. The polymer compositions of each layer generally contain curing agents such as divalent metal hydroxides and other additives such as pigments, fillers, pore-forming agents and liquid organic solvents, all as described in greater detail in U.S. Pat. No. 4,035,565 at column 6, lines 8–46. The compounding and subsequent curing of the terpolymer can be carried out as described in that patent.

The first terpolymer layer can vary in thickness considerably, depending on the intended use. However, in general, first layers in the present laminates will exhibit a thickness of about from 0.05 to 2.5 mm.

The second layer of the present laminates can be prepared from a variety of peroxide curable elastomers that will be co-curable with the first layer terpolymer containing the bromine or iodine.

The second layer, for example, can be prepared from fluoroelastomers as described in Apotheker et al., U.S. Pat. No. 4,214,060, hereby incorporated by reference. Fluoroelastomers found to be particularly useful are those prepared from tetrafluoroethylene, hexafluoropropylene, vinylidene fluoride and a bromo- or iodo-cure site monomer. These components can be present in the proportions discussed in the Apotheker et al. patent. However, proportions of 17–27 mole % hexafluoropropylene, 45–60 mole % vinylidene fluoride, 23–35 mole % tetrafluoroethylene and 0.1–1.5 mole % of the bromo- or iodo-cure site monomer have been found to be particularly satisfactory.

Silicone elastomers can also be used for the second layer. Such silicone elastomers can include polydiorganosiloxanes of the types described in detail in Polmanteer, U.S. Pat. No. 4,395,462, hereby incorporated by reference, and are commercially available from Dow Corning Corporation. Such elastomers are further described in Warrick et al., Rubber Chem. and Tech. 52(3) 1979, p. 448 et seq; and Lynch, "Handbook of Silicone Rubber Fabrication," Van Nostrand Reinhold Co., New York 1978, p. 34 et seq.

Copolymers of tetrafluoroethylene and propylene can also be used for the second layer of peroxide curable elastomer, and include those described in Brasen et al., U.S. Pat. No. 3,467,635, hereby incorporated by reference. Copolymers of this type are commercially available from Xenox, Inc. as Aflas fluoroelastomers.

The thickness of a elastomer used for the second layer in the present laminates can also vary widely, but will generally be at least about 0.05 mm. The maximum thickness of the elastomer can vary widely depending on the end use of the laminate, but will generally not exceed 25 mm.

To further improve the final bond characteristics between the first and second layers of the present laminates, each layer can contain up to about 25 weight percent of the polymer from the other layer.

The two layers of the present laminates are bonded together under pressure at elevated temperatures. The temperatures and pressures used will necessarily vary with the particular polymer and the thickness of the layers. However, in general, pressures of about from 0.25 to 15 MPa and temperatures of about from 125° C. to 200° C. are satisfactory. The time for effecting a satisfactory bond between the two layers is about from 1 to 90 minutes. The elevated temperatures and pressures effect a simultaneous bonding and co-curing of the polymers used in the first and second layers.

After release of the pressure initially used for preparation of the laminates, the co-cured laminate is preferably post-cured by exposure to elevated temperatures for optimum properties and dimensional stability. In general, post curing is carried out for a period of about from 1 to 48 hours at temperatures of about from 150° to 288° C., and results in increased dimensional stability. The post curing is preferably carried out in a nitrogen atmosphere to reduce oxidative degradation.

The present laminates can be bonded to a variety of other surfaces. In such composites, the second layer of the present laminate is bonded to the other surface, which can typically be metal or another elastomer. The specific bonding techniques used to form the composite will necessarily vary with the elastomer used for the second layer and the surface to which the present laminate is bonded, as known to those skilled in the art.

In the alternative, a multi-layered structure can be prepared simultaneously with the lamination of the first and second layers of the present laminates. For example, a metal substrate coated with a cured elastomeric layer can be further combined with a laminate of the present invention by bringing it into contact with pressure with an uncured two layer structure comprising the required first layer of elastomer of terpolymer with bromine or iodine moities and a second layer of curable elastomer composition which can comprise one or more of the required elastomeric polymers. Optionally, the second elastomeric polymer can be combined with the first layer of elastomer in combination with a solvent to aid in the application of the second layer of elastomer composition. Still another method of preparing a laminate of the present invention in situ, in combination with a substrate, involves first the application of the second layer of peroxide curable elastomer onto the substrate, followed by application of the first layer of elastomer, followed by co-curing the entire structure, thereby bonding the first layer of elastomer to the second layer of elastomer and, simultaneously, bonding the second layer of elastomer to the substrate. Such substrates can include, for example, a metal roll or a metal roll already covered with a cured layer of elastomer which is the same as or different from the second layer of elastomer used in the instant laminates.

The laminates of the present invention exhibit, on the surface of the first layer, the outstanding high temperature and solvent resistance characteristic of copolymers of tetrafluoroethylene and perfluoroalkyl perfluorovinylether. In addition, by virtue of the known bonding characteristics of the second layer polymer, these materials can be reliably and securely bonded to metal surfaces. Accordingly, the benefits of tetrafluoroethylene/perfluoroalkyl perfluorovinylether copolymers can be realized for rolls used in a variety of industrial applications as well as in electrostatic copying equipment, for fluid resistant liners as in bottle cap seals, diaphragms, seals, in flexible tubing and hose and as electrical wire covering.

The present invention is further illustrated by the following specific examples.

EXAMPLE 1

Two polymers were prepared for use in the first and second layers in a laminate, and designated polymers A and B, respectively. Polymer A was prepared from 67.6 mole % tetrafluoroethylene, 31.6 mole % perfluoromethyl perfluorovinylether, and 0.8 mole % bromotetrafluorobutene. Polymer B was polymerized from about 27 mole % tetrafluoroethylene, about 21.2 mole % hexafluoropropylene, about 51 mole % vinylidene fluoride, and about 0.8 mole % bromotetrafluorobutene. Each of these polymers was compounded with pigment, fillers and curing agents as shown in Table I, and the resulting compounds identified as Compounds I and IV, corresponding to the first and second layers, respectively.

Compounds I and IV were each formed into sheets having a thickness of about 1.4 millimeters. The sheets were plied together and a laminate formed by press-curing for 30 minutes at 210° C. in a 7.6×15.2×0.19 centimeter mold. The layers were separated for about 5 centimeters at one end by a thin spacer of Teflon fluoropolymer film to facilitate testing. Hand testing indicated good interlaminar adhesion. The laminate was post-cured under nitrogen for 24 hours at 232° C. Peel adhesion at 25° C. was measured on 2.54 centimeter wide strips pulled at 25.4 centimeters per minute according to ASTM test 816, procedure 12. Peel value was 0.94 kN/m with failure occuring by cohesive tearing of the layer containing compound I. A second specimen was pulled at 25° C. after heat-aging in air for 50 hrs at 250° C. Peel values actually increased to 1.3 kN/m with failure again occuring cohesively in the layer containing compound I.

EXAMPLE 2

Compound V was prepared from a 75/25 blend of polymers A and B, using the ingredients shown in Table I. A sheet of compound V was laminated to a layer of compound IV by press-curing for 30 mins at 177° C. Both compounds were backed by a woven sheet of "Nomex" aramid fiber. The laminate was then post-cured in nitrogen under the following temperature program:

4 hrs/90° C.
6 hrs/90° C. to 204° C.
12 hrs/204° C.
6 hrs/204° to 288° C.
18 hrs/288° C.

Peel adhesion averaged 2.5 kN/m with failure occurring cohesively in the layer containing compound IV.

Compounds were prepared for use in Examples 3-5 from polymers A and B. Other compounds were prepared from a polymer C, which was prepared as polymer A, but using iodo-tetrafluorobutene instead of bromo-tetrafluorobutene. Polymer D is polydimethylsiloxane with methylvinylsiloxane monomer added to provide cross-linking sites. This polymer is available from Dow-Corning as Silastic HE-26. Polymer E is a copolymer of tetrafluoroethylene and propylene commercially available from Xenox, Inc. as Alfas 150P and Polymer F is fluorosilicone commercially available from Dow Corning Company as Silastic LS-422. The various polymers were compounded, and the composition of compounds VI to XIII is summarized in Table II.

EXAMPLE 3

A 1.1 mm thick sheet of Compound VI was placed with a 1.3 mm thick sheet of Compound VII in a 1.9×76×152 mm mold. The layers were separated at one end for 4 cm with a thin layer of Teflon ® fluorocarbon resin. A laminate was formed by press-curing for 30 minutes at 177° C. and a pressure of 13.4 MPa. The peel adhesion value of a 2.54 cm wide strip cut from this laminate was 2.8 kN/m, with cohesive failure in the second layer. A 2.54 cm strip which had been post-cured under nitrogen for 24 hours at 232° C. had a peel adhesion value of 1.8 kN/m, failure again occurring in the second layer.

EXAMPLE 4

A laminate of Compound VIII with Compound I was prepared. A 1.5 mm thick sheet of Compound I was placed with a 1.5 mm sheet of Compound VIII in a 1.9×76×152 mm mold. The layers were separated at one end with a thin spacer of Teflon ® fluoropolymer film. The silicone layer was backed by a woven sheet of Nomex ® aramid fiber. The laminate was formed by press-curing for 30 minutes at 177° C. and a pressure of 13.4 MPa. The peel adhesion value of a 2.54 cm wide strip was 2.6 kN/m with cohesive failure in the silicone layer. A 2.54 cm strip was post-cured under nitrogen for 32 hours at 200° C. and had a peel adhesion value of 2.4 kN/m, failure again occurring in compound VIII, the silicone layer.

EXAMPLE 5

A laminate of compound IX and compound X was prepared. A 1.4 mm thick sheet of Compound IX was placed with a 1.6 mm thick sheet of Compound X in a 1.9×76×152 mm mold. The layers were separated at one end for 4 cm with a thin layer of Teflon ® fluoropolymer. The laminate was formed by press curing for 30 minutes at 177° C., and it was then post-cured under nitrogen for 32 hours at 200° C. The peel adhesion value of a 2.54 cm strip was 0.4 kN/m (adhesive failure).

EXAMPLE 6

A laminate of Compound III and Compound XII was prepared. A 76×152×1.0 mm thick sheet of Compound III was plied up with a 76×152×1.5 mm thick sheet of Compound XII backed by a layer of Nomex nylon cloth in a 76×152×1.9 mm mold. The two layers of compound were separated at one end with a thin layer of FEP Teflon. The laminate was formed by press-curing for 15 minutes at 175° C. The laminate was then post-cured under nitrogen for 16 hours at 195° C. The peel adhesion of a 2.54 cm strip was 0.79 kN/m (adhesive failure).

EXAMPLE 7

Fabrication of a Slab Laminate Using a Tie Layer of Uncured Compound XI

A 152×152×0.81 mm thick sheet of Compound XI was placed between a 152×152×1.7 mm thick pre-cured slab of Viton ®E60C ® fluoroelastomer and a 152×152×0.18 mm thick sheet of Compound II. The assembly was preseed between Teflon sheets at 177° C. for 30 minutes at 0.5 MPa. When a sample of the well-bonded laminate was totally immersed in methyl ethyl ketone for 3 days at room temperature it became severely warped due to swelling of the Viton ® layer by the solvent, but no delamination occurred at either of the elastomer interfaces.

EXAMPLE 8

Fabrication of a Laminate in Roll Cover Form Using a Tie Layer of Compound XI Applied as a Sprayable Dispersion A sprayable dispersion of Compound XI was prerared by ball-milling a mixture of 50 g. of Compound XI, 375 mL. of methylene chloride and 1.0 g. of Luperco ®101X1 in a 0.95 liter ball mill for 16 hours at room temperature. An aluminum roll core covered with a layer of tin-cured RTV silicone (total roll diameter ca. 8.255 cm) was spray-coated with a sufficient amount of the dispersion to give a final tie layer thickness of 0.15 to 0.20 mm. After air drying for one hour, the coated roll was covered with a single calendered sheet of compound II approximately 0.25 mm thick and of sufficient length to give an overlapped joint approximately 3 mm wide. The assembly was then covered with FEP Teflon heat-shrinkable tubing which had been precoated on the inside with a mold release agent. After shrinking the Teflon fluoropolymer tubing with heat, the excess Compound II and Teflon fluoropolymer sticking out over the end of the roll was trimmed off and aluminum end caps (O.D. 8.438 cm) were bolted onto the ends of the assembly. The roll at this stage had an outside diameter of 8.438 to 8.443 cm. It was placed inside a cold rolled steel cylindrical sleeve with 8.443 cm inside diameter and the assembly was heated in an oven at 180° C. for 1.5 to 2 hours. After slow cooling the roll was removed from the sleeve, the Teflon cover was removed, and the roll was then post-cured in a nitrogen-purged oven for 6 hours at 150° C. and for 32 hours at 200° C. When an attempt was made to remove the Compound II cover from the roll, stock tear occured in the Compound II layer.

EXAMPLE 9

A laminate of Compound III and Compound XIII was prepared. A 152×152×1.0 mm sheet of Compound III was plied up with a 152×152×1.5 mm sheet of Compound XIII backed by a layer of Nomex nylon cloth in a 152×152×1.9 mm mold. The two layers of compound were separated at one end with a thin film of FEP Teflon. The laminate was formed by press-curing for 15 minutes at 175° C. The laminate was then post-cured under nitrogen for 5 hours at 200° C. The peel adhesion of a 2.54 cm wide strip was 0.2 kN/m.

TABLE I

|  | Compound No. | | | | |
| --- | --- | --- | --- | --- | --- |
|  | I | II | III | IV | V |
| Polymer A | 100 | 100 | 100 |  | 75 |
| Polymer B |  |  |  | 100 | 25 |
| 18-crown-6 | 0.3 | 0.3 | 0.3 |  | 0.3 |
| Sublimed Litharge | 3.0 | 3.0 | 3.0 | 3.0 | 3.0 |
| Luperco-101-XL | 4.0 | 5.5 | 3.0 | 3.0 | 3.0 |
| Triallylisocyanurate | 4.0 | 4.0 | 3.0 | 3.0 | 3.0 |
| SAF Black | 10 | 10 | 10.0 |  | 7.0 |
| MT Black |  |  |  | 30 | 10 |

TABLE I-continued

|  | Compound No. | | | | |
|---|---|---|---|---|---|
|  | I | II | III | IV | V |
| ODR |  |  |  |  |  |
| (60 mins/177° C.) |  |  |  |  |  |
| $M_L$, kg cm | 18.0 | Not | Not | 10.5 | 17.1 |
| $t_s$ 2, min | 2.1 | Tested | Tested | 1.0 | 1.8 |
| $t_c$ 90, min | 6.0 | — | — | 9.5 | 11.0 |
| $M_H$, kg cm | 67.0 | — | — | 44.0 | 54.5 |
| Tensile Test (ASTM-D412-Method A, Small Dumbbells) |  |  |  |  |  |
| $M_{100}$, MPa | Not | 12.6 | 11.0 | Not | 4.3 |
| $T_B$, MPa | tested | 17.4 | 19.4 | Tested | 4.7 |
| $E_b$, % |  | 135 | 150 |  | 280 |

TABLE II

|  | Compound No. | | | | | | | |
|---|---|---|---|---|---|---|---|---|
|  | VI | VII | VIII | IX | X | XI | XII | XIII |
| Polymer C | 100 | — | — | 100 | — | — | — | — |
| Polymer D | — | — | 100 | — | 100 | 100 | — | — |
| Polymer A | — | — | — | — | — | — | — | — |
| Polymer B | — | 100 | — | — | — | — | — | — |
| Polymer E | — | — | — | — | — | — | 100 | — |
| Polymer F | — | — | — | — | — | — | — | 100 |
| 18-Crown-6 | 1.0 | — | — | 1.0 | — | — | — | — |
| Sublimed Litharge | 4 | 3 | — | 4 | — | — | — | — |
| Luperco 101-XL | 5 | 3 | 2 | 5 | 2 | 2 | 3 | 2 |
| Triallyl Isocyanurate | — | 3 | 1 | 1 | 1 | 1 | 5 | 1 |
| SAF Black | 10 | — | — | 10 | — | — | — | — |
| MT Black | — | 30 | — | — | — | — | 20 | — |
| HVA-2 | 1.7 | — | — | — | — | — | — | — |
| Calcined Alumina[a] | — | — | 60 | — | 60 | 60 | — | 60 |
| Iron Oxide Paste[b] | — | — | 10 | — | 10 | 10 | — | 10 |
| Cabosil | — | — | — | — | 2 | — | — | — |
| Silastic HT-1[c] | — | — | — | — | — | 1 | — | — |

[a]Alcoa A-16-SG
[b]Kenrich Petrochemical - Kencolor K-67055 red iron oxide in p-(dimethylsiloxane) (75/25)
[c]Dow Corning Heat Stabilizer

We claim:

1. A laminate prepared from
   (a) a first layer of peroxide curable elastomer composition of a terpolymer of tetrafluoroethylene, a perfluoroalkyl perfluorovinylether wherein the alkyl group contains 1 to 5 carbon atoms, and up to about 2 mole percent of units derived from an ethylenically unsaturated compound having a bromo- or iodo-substituent in an amount sufficient to provide at least about 0.1 mole percent bromine or iodine in the resulting terpolymer, and
   (b) a second layer of peroxide curable elastomer composition of a polymer selected from the group consisting of
      (1) copolymers prepared from monomers consisting essentially of tetrafluoroethylene, hexafluoropropylene, vinylidene fluoride and a bromo- or iodo cure site monomer;
      (2) silicone elastomers and
      (3) copolymers of tetrafluoroethylene and propylene, the laminate being co-cured and the first and second layers being directly bonded to each other.

2. A co-cured laminate of claim 1 wherein the second layer is a copolymer prepared from monomers consisting essentially of tetrafluoroethylene, hexafluoropropylene, vinylidene fluoride and a bromo- or iodo-cure site monomer.

3. A co-cured laminate of claim 1 wherein the second layer is a silicone elastomer.

4. A co-cured laminate of claim 1 wherein the unsaturated compound used in the preparation of the terpolymer is 4-bromo-3,3,4,4-tetrafluorobutene-1.

5. A co-cured laminate of claim 1 wherein the unsaturated compound used in the preparation of the first layer terpolymer is 4-iodo-3,3,4,4-tetrafluorobutene-1.

6. A co-cured laminate of claim 1 in which the second layer is bonded to a metal substrate.

7. A co-cured laminate of claim 1 in which the second layer is bonded to a layer of cured elastomer.

8. A co-cured laminate of claim 7 in which the layer of cured elastomer is bonded to a metal substrate.

9. A co-cured laminate of claim 8 in which the metal substrate is in the form of a roll.

10. A laminar structure consisting essentially of
   (a) a metal substrate
   (b) a peroxide curable elastomer composition of a polymer selected from the group consisting of
      (1) copolymers prepared from monomers consisting essentially of tetrafluoroethylene, hexafluoropropylene, vinylidene fluoride and a bromo- or iodo-cure site monomer;
      (2) silicone elastomers; and
      (3) copolymers of tetrafluoroethylene and propylene
   (c) a peroxide curable perfluoroelastomer composition of a terpolymer of tetrafluoroethylene, a perfluoro alkyl perfluorovinylether wherein the alkyl group contains 1 to 5 carbon atoms, and up to about two mole percent of units derived from an ethylenically unsaturated compound having a bromo- or iodo-substituent in an amount sufficient to provide at least about 0.1 mole percent bromine or iodine in the resulting terpolymer, wherein (b) and (c) are co-cured and directly bonded to each other.

* * * * *